(12) United States Patent
Kobayashi

(10) Patent No.: US 8,756,287 B2
(45) Date of Patent: Jun. 17, 2014

(54) E-MAIL DELIVERY DEVICE, E-MAIL DELIVERY SYSTEM, AND E-MAIL DELIVERY PROGRAM

(75) Inventor: Masato Kobayashi, Tokyo (JP)

(73) Assignee: Casting Media, Inc., Tokyo (JP)

( * ) Notice: Subject to any disclaimer, the term of this patent is extended or adjusted under 35 U.S.C. 154(b) by 294 days.

(21) Appl. No.: 13/133,774

(22) PCT Filed: Dec. 17, 2009

(86) PCT No.: PCT/JP2009/071044
§ 371 (c)(1),
(2), (4) Date: Jun. 9, 2011

(87) PCT Pub. No.: WO2010/071175
PCT Pub. Date: Jun. 24, 2010

(65) Prior Publication Data
US 2011/0252106 A1   Oct. 13, 2011

(30) Foreign Application Priority Data
Dec. 19, 2008   (WO) .................. PCT/JP2008/073172

(51) Int. Cl.
*G06F 15/16*   (2006.01)
*G06F 15/173*   (2006.01)

(52) U.S. Cl.
USPC .......................................... 709/206; 709/240

(58) Field of Classification Search
None
See application file for complete search history.

(56) References Cited

U.S. PATENT DOCUMENTS

| 2002/0065723 | A1* | 5/2002 | Anderson et al. ................ 705/14 |
| 2003/0149641 | A1* | 8/2003 | Kouketsu et al. ................ 705/27 |
| 2005/0204002 | A1* | 9/2005 | Friend ........................... 709/206 |
| 2009/0248523 | A1* | 10/2009 | Hueter et al. .................... 705/14 |

FOREIGN PATENT DOCUMENTS

| JP | 2001-283080 A1 | 10/2001 |
| JP | 2003-256718 A1 | 9/2003 |
| JP | 2008-59512 A1 | 3/2008 |
| WO | WO 02/065302 A1 | 8/2002 |

OTHER PUBLICATIONS

International Search Report for International Application No. PCT/JP2009/071044 dated Jan. 5, 2010.

* cited by examiner

*Primary Examiner* — John B. Walsh
(74) *Attorney, Agent, or Firm* — Kratz, Quintos & Hanson, LLP

(57) ABSTRACT

When a membership number acquisition unit obtains a membership number from a management device, an identification information creation unit assigns a unique identification data to the membership number, creates identification information element containing the assigned identification data and the obtained membership number, and assigns an e-mail storing unit to the identification information element on a one-to-one basis. When a target e-mail acquisition unit obtains the selected membership number and the e-mail from the management device, a delivery unit identifies the identification information element that contains the membership number that agrees with the obtained selected membership number and stores the obtained e-mail in the e-mail storing unit that corresponds to the specified identification information element.

6 Claims, 9 Drawing Sheets

FIG. 4

MEMBERSHIP INFORMATION D1

| MEMBER NO. | NAME | AGE | SEX | ADDRESS | E-MAIL ADDRESS |
|---|---|---|---|---|---|
| 101 | AAAA | 30 | MALE | TOKYO····· | ***@xxx.ne.jp |
| 102 | BBBB | 28 | FEMALE | KANAGAWA····· | — |
| 103 | CCCC | 42 | MALE | HOKKAIDO····· | ***@xxx.co.jp |
| ·· | ·· | ·· | ·· | ·· | ·· |

FIG. 5

IDENTIFICATION INFORMATION D2

| MEMBER NO. | ID | E-MAIL ADDRESS | PASSWORD | FWD E-MAIL ADDRESS |
|---|---|---|---|---|
| 101 | A001 | B001@xxxx.com | XXXX | ADDRESS 001 |
| 102 | A002 | B002@xxxx.com | YYYY | NULL |
| 103 | A003 | B003@xxxx.com | ZZZZ | ADDRESS 003 |
| ·· | ·· | ·· | ·· | ·· |

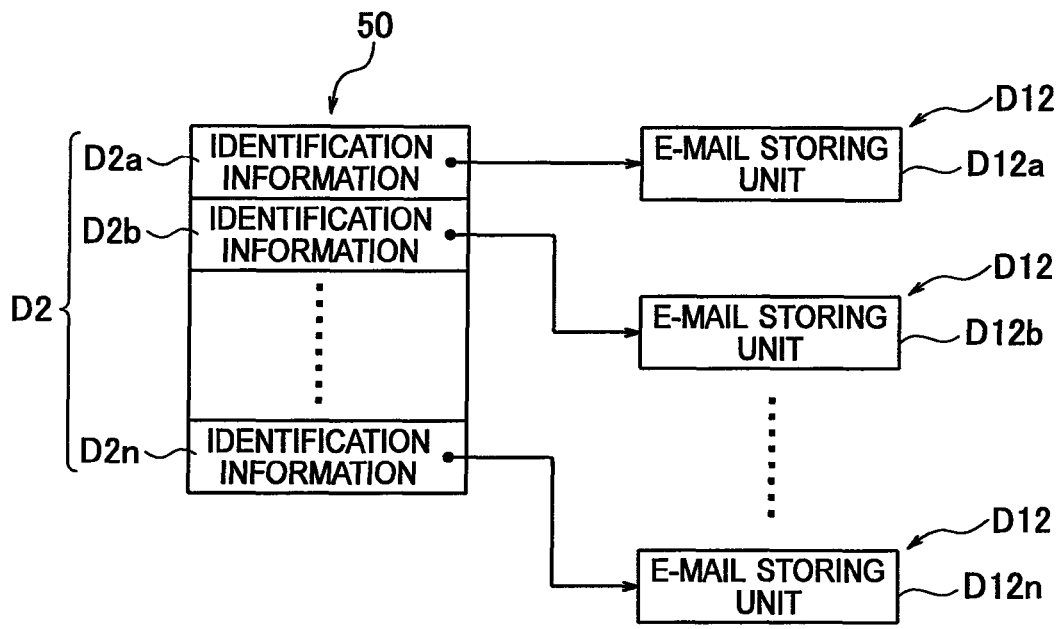

E-MAIL DELIVERY DEVICE, E-MAIL DELIVERY SYSTEM, AND E-MAIL DELIVERY PROGRAM

TECHNICAL FIELD

The present invention relates to an e-mail delivery device, an e-mail delivery system, and an e-mail delivery program configured for delivering e-mail to an intended target member from among registered members.

BACKGROUND ART

Wide use of computers and the Internet in recent years has encouraged use of e-mail as a medium for exchange of information. In particular, information providers (or other information administrators) often use e-mail to distribute information to its members having membership. For example, the patent literature PTL 1 discloses an e-mail delivery device configured and adapted to deliver e-mail to registered users, which are the members having the membership, the e-mail being created by the information provider and containing addresses of information service websites.

CITATION LIST

Patent Literature

PTL 1: Japanese Patent Application Laid-Open Publication No. 2001-283080

SUMMARY OF THE INVENTION

Technical Problem

The e-mail delivery device as described in the patent literature PTL 1 is configured and adapted to deliver e-mail to intended target member(s) based on private information of the intended target members. When using an e-mail delivery device of this type, the members have to register their private information such as name, age, sex, address, and e-mail address.

The information provider delivers e-mail to the intended target member(s) by sending the e-mail to a target destination registered as part of the target member's private information, i.e., an e-mail address registered by the members.

Since the target destinations differ depending on the information to be distributed, the information provider has to select the intended target member(s) to deliver the e-mail. For example, when the information to be distributed is cosmetics for women, this information will not be necessary for male members. In this case, e-mail delivery will be done by selecting the intended target member on the basis of sex registered as part of the member's private information. Specifically, e-mail delivery will be made by only selecting female members from among the registered members in a case where the e-mail contains information associated with cosmetics for women. For this reason, the information provider always needs to have the member's private information such as age and sex in order to select the intended target members from among the registered members. In addition, the information provider that holds the members' private information has to provide security measures to prevent inadvertent leakage of the members' private information and unauthorized use thereof.

Further, outsourcing of the e-mail delivery operation to another company implies that the members' private information has to be disclosed to the third party company. For this reason, it can happen that the members' private information is leaked via the third party even when the information provider as such provides improved security.

Also, when a member attempts to change his or her registered address and e-mail address, the content of the registered member's private information needs to be modified with additional information included as required, and the members' private information that has been disclosed to the third party also needs to be modified, which could cause increase in maintenance costs thereof. Further, when any change made to the registered e-mail address is not notified by the member, or when the member does not have his or her e-mail address, it will not be possible to successfully deliver the e-mail to this member.

In view of the above-identified drawbacks, an object of the present invention is to provide an e-mail delivery device, an e-mail delivery system, and an e-mail delivery program configured for reliably delivering e-mail by only relying upon unique membership numbers of the members, the members being selected under a prescribed delivery condition without using the members' private information.

Solution to Problem

In order to provide solution to the above identified problems, a first aspect of the present invention provides an e-mail delivery device 10, which is shown in the basic configuration of FIG. 1 and configured for communication with a management device 20 via a communication unit 16, the management device 20 being configured to associate membership numbers each indicative of registered members with private information of the registered members for management of the membership numbers and the private information, and configured for delivering an e-mail to an intended target member from among the registered members.

The e-mail delivery device 10 comprises (a) a membership number acquisition unit P11, (b) an identification information creation unit P12, (c) a notification unit P13, (c) a notification unit P13, (d) an identification information storing unit D11, (e) a target e-mail acquisition unit P14, (f) a delivery unit P15, and (g) a transmitting unit P16.

The membership number acquisition unit P11 is configured to obtain any one of the membership numbers of the members from the management device via a communication unit 16.

The identification information creation unit P12 is configured to (i) assign a unique identification data to each of the membership numbers that have been obtained by the membership number acquisition unit P11, (ii) create identification information element containing the obtained membership number and the identification data assigned thereto, and (iii) assigning an e-mail storing unit D12 to the identification information element on a one-to-one basis, the e-mail storing unit D12 being adapted to store an e-mail that corresponds to the identification information element.

The notification unit P13 is configured to report the created identification information element to the management device 20 via the communication unit 16.

The identification information storing unit D11 is configured to associate the created identification information element with the membership number and store the associated identification information element.

The target e-mail acquisition unit P14 is configured to obtain (i) a selected membership number and (ii) a target e-mail from the management device 20 via the communication unit 16, the selected membership number being selected from among the membership numbers in accordance with a prescribed delivery condition, the selection being performed by the management device 20, and the target e-mail being intended to be delivered to the selected membership number.

The delivery unit P15 is configured to (i) identify the identification information element containing the membership number that agrees with the obtained selected membership number and (ii) store the obtained e-mail in the e-mail storing unit D12 that corresponds to the identified identification information element.

The transmitting unit P16 is configured to (i) identify the e-mail storing unit D12 that corresponds to the identification information element that has been designated by the member and (ii) transmit the e-mail stored in the e-mail storing unit D12 to this member.

According to the e-mail delivery device of the present invention in the first aspect, when the membership number acquisition unit P11 obtains the membership number via the communication unit 16 from the management device 20, the identification information creation unit P12 assigns the unique identification data to this membership number. When the identification information element including the assigned identification data and the obtained membership number is created, the e-mail storing unit D12 is allocated for the identification information on the one-to-one basis. Also, the created identification information element is associated with the membership number and stored in the identification information storing unit D11, and they are reported by the notification unit P13 to the management device 20 via the communication unit 16. Further, when the specific membership number is selected by the management device 20 from among the membership numbers in accordance with the prescribed delivery condition and the e-mail is created that is to be delivered to the selected membership number, then the target e-mail acquisition unit P14 obtains the selected membership number and the e-mail from the management device 20 via the communication unit 16. The delivery unit P15 identifies the identification information element containing the membership number that agrees with the obtained selected membership number, and the obtained e-mail is stored in the e-mail storing unit D12 that corresponds to the specified identification information. In this manner, the e-mail is only delivered to the e-mail storing unit D12 of the delivery target. Further, when the member specifies the identification information, the e-mail transmitting unit P16 identifies the e-mail storing unit D12 that corresponds to the specified identification information, and transmits the e-mail stored in the e-mail storing unit D12 to the member.

In order to provide solution to the above identified problems, a second aspect of the present invention provides an e-mail delivery device of the present invention as shown in the basic configuration of FIG. 1, in the context of the e-mail delivery device 10 according to the first aspect, characterised by the fact that the device further includes (h) a forwarding e-mail address acquisition unit P17 configured to obtain via the communication unit 16 a forwarding e-mail address to which the e-mail in the e-mail storing unit D12 is to be delivered, and associate the forwarding e-mail address with the e-mail storing unit D12; and (i) a forwarding unit P18 configured to forward the e-mail stored in the e-mail storing unit D12 to the obtained forwarding e-mail address.

According to the e-mail delivery device of the present invention in the second aspect, when the forwarding e-mail address acquisition unit P17 obtains the forwarding e-mail address to which the e-mail stored in the e-mail storing unit D12 is to be forwarded, from, for example, the management device 20, or terminal devices used by the members via the communication unit 16, the forwarding unit P18 forwards the e-mail stored in the e-mail storing unit D12 to the forwarding e-mail address.

In order to provide solution to the above-identified problem, a third aspect of the present invention provides the e-mail delivery device, as shown in the basic configuration of FIG. 1, that is characterized by the fact that the device includes a log information storing unit D13 configured to indicate log information indicative of a delivery result of the e-mail to the selected membership number, the e-mail being obtained by the target e-mail acquisition unit P14.

According to the e-mail delivery device of the present invention in the third aspect, when the target e-mail acquisition unit P14 obtains the selected membership number and the e-mail and the e-mail is delivered by the delivery unit P15 to the selected membership number, the log information indicative of the delivery results regarding the selected membership number is stored in the log information storing unit D13.

In order to provide solution to the above-identified problem, a fourth aspect of the present invention provides the e-mail delivery device characterized by the fact that, as shown in the basic configuration of FIG. 1, the log information storing unit D13 includes a log information transmitting unit P19 configured to transmit the log information to a predetermined destination.

According to the e-mail delivery device of the present invention in the fourth aspect, log information stored in the log information storing unit D13 is transmitted by the log information transmitting unit P19 to, for example, a requesting party of the to-be-distributed information and an administrator of the management device 20.

In order to provide solution to the above-identified problem, a fifth aspect of the present invention provides the e-mail delivery system, as shown in the basic configuration of FIG. 1, which includes the e-mail delivery device 10 and the management device 20 of any one of first to fourth aspects, characterized by the fact that the management device 20 includes a membership number outputting unit P21 configured to output the membership number of the member to the e-mail delivery device; and a membership number selecting unit P22 configured to select a selected membership number from among the members in accordance with the prescribed delivery condition and output the selected membership number and the e-mail to be delivered to the selected membership number to the e-mail delivery device.

According to the e-mail delivery device of the present invention in the fifth aspect, when the membership number outputting unit P21 of the management device 20 outputs the membership number to the e-mail delivery device 10, the membership number acquisition unit P11 of the e-mail delivery device 10 obtains the membership number via the communication unit 16. The identification information creation unit P12 of the e-mail delivery device 10 assigns a unique identification data to the membership number. When the identification information containing the assigned identification data and the obtained membership number is created, the identification information is assigned to the e-mail storing unit D12 on a one-to-one basis. Also, the created identification information is associated with the membership number and stored in the identification information storing unit D11, and is reported by the notification unit P13 to the management device 20 via the communication unit 16. When the Also, the membership number selecting unit P22 of the management device 20 creates the specific membership number selected from among the membership numbers in accordance with the prescribed delivery condition and the e-mail to be delivered to the selected membership number and output them to the e-mail delivery device 10, the target e-mail acquisition unit P14 obtains the selected membership number and the e-mail from the management device 20 via the communication unit 16. The delivery unit P15 identifies the identification information element that contains the membership number that agrees with the obtained selected membership number, and stores the obtained e-mail in the e-mail storing unit D12 that corresponds to the specified identification information element. In this manner, the e-mail is only delivered to the e-mail storing unit D12 of the intended destination. When the member specifies the identification information element, the e-mail transmitting unit P16 identifies the e-mail storing unit D12 that corresponds to the specified identification information, and transmits the e-mail stored in the e-mail storing unit D12 to the member.

According to the e-mail delivery program according to a sixth aspect of the present invention, as shown in the basic configuration of FIG. 1, there is provided a computer-executable e-mail delivery program for a computer of an e-mail delivery device 10 that is configured for communication with a management device 20 via the communication unit 16, the management device 20 being configured to associate membership numbers each indicative of registered members with private information of the registered members for management of the membership numbers and the private information, and deliver e-mail to an intended target member from among the registered members.

The e-mail delivery program is configured for providing the computer with functions including: (a) a membership number acquisition unit P11, (b) an identification information creation unit P12, (c) a notification unit P13, (c) a notification unit P13, (d) an identification information storing unit D11, (e) a target e-mail acquisition unit P14, (f) a delivery unit P15, and (g) a transmitting unit P16.

The membership number acquisition unit P11 is configured to obtain any one of the membership numbers of the members from the management device via a communication unit 16.

The identification information creation unit P12 is configured to (i) assign a unique identification data to each of the membership numbers that have been obtained by the membership number acquisition unit P11, (ii) create identification information element containing the obtained membership number and the identification data assigned thereto, and (iii) assigning an e-mail storing unit D12 to the identification information element on a one-to-one basis, the e-mail storing unit D12 being adapted to store an e-mail that corresponds to the identification information element.

The notification unit P13 is configured to report the created identification information element to the management device 20 via the communication unit 16.

The identification information storing unit D11 is configured to associate the created identification information element with the membership number and store the associated identification information element.

The target e-mail acquisition unit P14 is configured to obtain (i) a selected membership number and (ii) a target e-mail from the management device 20 via the communication unit 16, the selected membership number being selected from among the membership numbers in accordance with a prescribed delivery condition, the selection being performed by the management device 20, and the target e-mail being intended to be delivered to the selected membership number.

The delivery unit P15 is configured to (i) identify the identification information element containing the membership number that agrees with the obtained selected membership number and (ii) store the obtained e-mail in the e-mail storing unit D12 that corresponds to the identified identification information element.

The transmitting unit P16 is configured to (i) identify the e-mail storing unit D12 that corresponds to the identification information element that has been designated by the member and (ii) transmit the e-mail stored in the e-mail storing unit D12 to this member.

According to the e-mail delivery program of the present invention in the sixth aspect, when the computer of the e-mail delivery device 10 obtains the membership number from the management device 20 via the communication unit 16, the computer of the e-mail delivery device 10 assigns a unique identification data to this membership number. Further, when the computer of the e-mail delivery device 10 creates the identification information containing the assigned identification data and the obtained membership number, then the computer of the e-mail delivery device 10 assigns the e-mail storing unit D12 to the identification information on a one-to-one basis. Also, the created identification information is associated with the membership number and is stored in the identification information storing unit D11 and is reported to the management device 20 via the communication unit 16. As the specific membership number selected by the management device 20 from among the membership numbers in accordance with the prescribed delivery condition and the e-mail to be delivered to the selected membership number are created, the computer obtains the selected membership number and the e-mail via the communication unit 16 from the management device 20. The computer identifies the identification information having the membership number that agrees with the obtained selected membership number, and stores the obtained e-mail in the e-mail storing unit D12 that corresponds to the specified identification information. In this manner, the e-mail is only delivered to the intended e-mail storing unit D12. Also, when the member specifies the identification information, the computer identifies the e-mail storing unit D12 that corresponds to the specified identification information, and transmits the e-mail stored in the e-mail storing unit D12 to the member.

Advantageous Effects of Invention

As has been described in the foregoing, according to the first, fifth, and sixth aspects of the present invention, when an e-mail is delivered to an intended target member from among the registered members, the e-mail delivery device obtains the member's membership number from the management device and creates the identification information that corresponds to each of the membership numbers and providing the e-mail storing units that each correspond to each of the identification information elements, and stores the e-mail in the e-mail reception storing unit that corresponds to the selected membership number that has been selected by the management device to deliver the e-mail. With this configuration, the party that delivers the e-mail can reliably deliver the e-mail to the target member without the need of holding the member's private information, which facilitates outsourcing of the delivery of e-mail to other companies. Further, the party that delivers the e-mail does not need to hold the private information, which allows prevention of inadvertent leakage of the member's private information and unauthorized use of the private information, which contributes to improved security.

Also, when e-mail delivery operation is outsourced to other companies, the member's private information does not need to be disclosed to those third parties, and thus leakage of the private information can be effectively prevented. Also, management can be made possible only using the membership number and the system's maintenance costs can be minimized.

Also, since the e-mail storing units that correspond to the members on the one-to-one basis is provided, it is possible to deliver the to-be-delivered e-mail to the e-mail storing unit of the delivery destination, and deliver information by the e-mail even to members whose e-mail addresses are not registered as the private information. Further, since the e-mail stored in the e-mail storing units that correspond to the identification information elements on a one-to-one basis is transmitted to the member, the e-mail is not directly delivered to the member's individual e-mail address, making it possible for the member to obtain the necessary to-be-distributed information without registration of the member's private information.

According to the second aspect of the present invention, since the e-mail received by the e-mail reception unit is forwarded to the forwarding e-mail address that has been registered by the member, it is possible to forward the e-mail to the e-mail address used by the member without holding the member's private information other than the e-mail address, which makes it possible for the member to view the e-mail that has been delivered with higher probability.

According to the third aspect of the present invention, since the log information indicative of the result of delivery of the e-mail to the selected membership number is stored, it is possible, for example, to confirm whether or not the e-mail has been successfully delivered to the intended member selected by the delivery condition by referencing the log information by the information provider and the management device.

According to the fourth aspect of the present invention, since the log information stored in the log information storing unit is transmitted to the predetermined destination, with the destination specified as the information provider or the management device, the information provider and the management device are allowed to confirm to which member the information provider (information sender) has delivered the information by referencing the received log information and manage the delivery history using the log information.

BRIEF DESCRIPTION OF THE DRAWINGS

FIG. 4 is a table of a private information database used in the management device;

FIG. 5 is a table of an identification information database used in the e-mail delivery device according to one embodiment of the present invention;

FIG. 6 illustrates relationship between the identification information and an e-mail storing unit;

FIG. 7 is a table of a log information database used in the e-mail delivery device according to one embodiment of the present invention;

REFERENCE SIGNS

1 E-mail delivery system
10 E-mail delivery device
16 Communication unit
20 Management device
P11 Membership number acquisition unit
P12 Identification information creation unit
P13 Notification unit
P14 Target e-mail acquisition unit
P15 Delivery unit
P16 E-mail transmitting unit
P17 Forwarding e-mail address acquisition unit
P18 Forwarding unit
P19 Log information transmitting unit
P21 Membership number outputting unit
P22 Membership number selecting unit
D1 Private information
D2 Identification information
D3 Log information
D11 Identification information storing unit
D12 E-mail storing unit

DESCRIPTION OF EXEMPLARY EMBODIMENT

The following describes an e-mail delivery device, e-mail delivery system, and e-mail delivery program of the present invention with reference to FIGS. 1 to 11.

Figure 1:
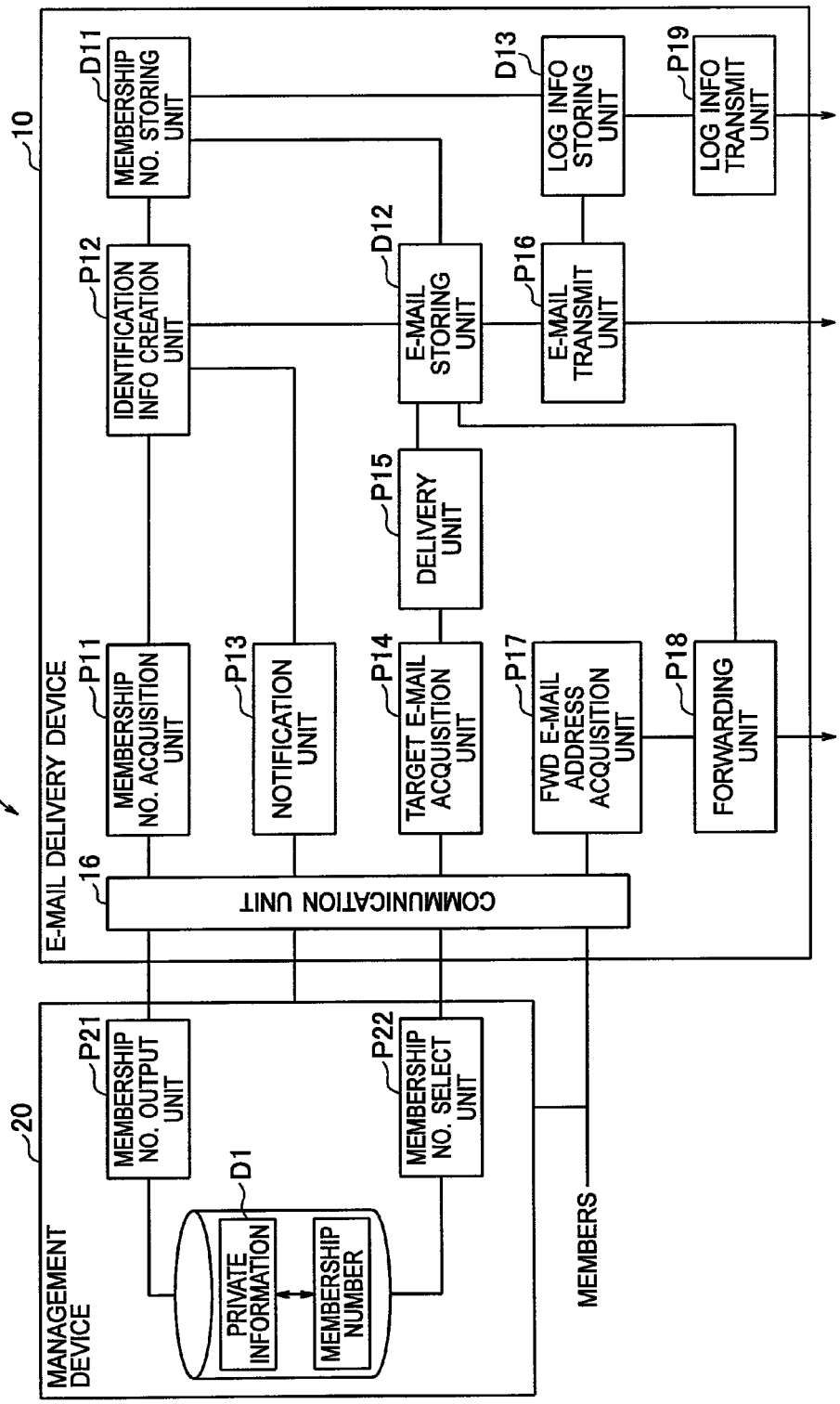
FIG. 1 is a configuration diagram illustrating an e-mail delivery device, a management device, and an e-mail delivery system.
Figure 2:
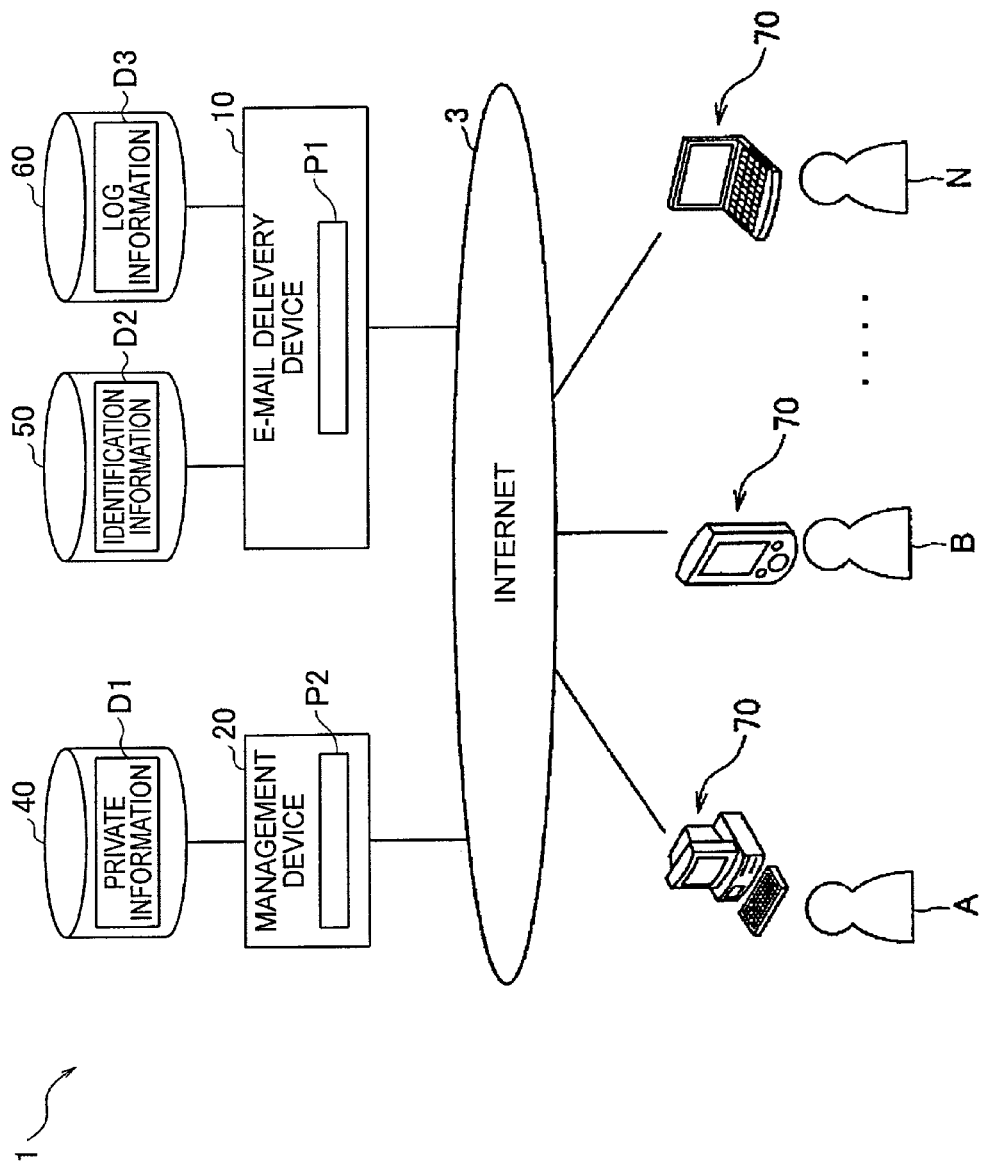
FIG. 2 is a system configuration diagram schematically illustrating the e-mail delivery device, the management device, and the e-mail delivery system.

Referring to FIG. 2, there is shown an e-mail delivery system 1 that comprises an e-mail delivery device 10 and a management device 20. The e-mail delivery device 10 is installed in a company that is involved in delivery of e-mails. The management device 20 is installed in a company that is involved in management of private information of registered members A to N.

The e-mail delivery device 10 and the management device 20 are connected to each other via the Internet 3 for communications therebetween to transmit and receive various data to and from each other. Electrically connected to the Internet 3 are various terminal devices 70 such as personal computers and mobile phones used by the members A to N for communications among the e-mail delivery device 10, the management device 20, and the terminal devices 70. It should be noted that modes of communications between the e-mail delivery device 10 and the management device 20 may be via direct connection or based on wireless/wired communications. Although this embodiment describes an example where communications are made via the Internet 3, the present invention is not limited to this specific mode of communications, and the present invention can be effectuated using communications via various communications networks.

The configuration of the management device 20 is described below.

Figure 3:
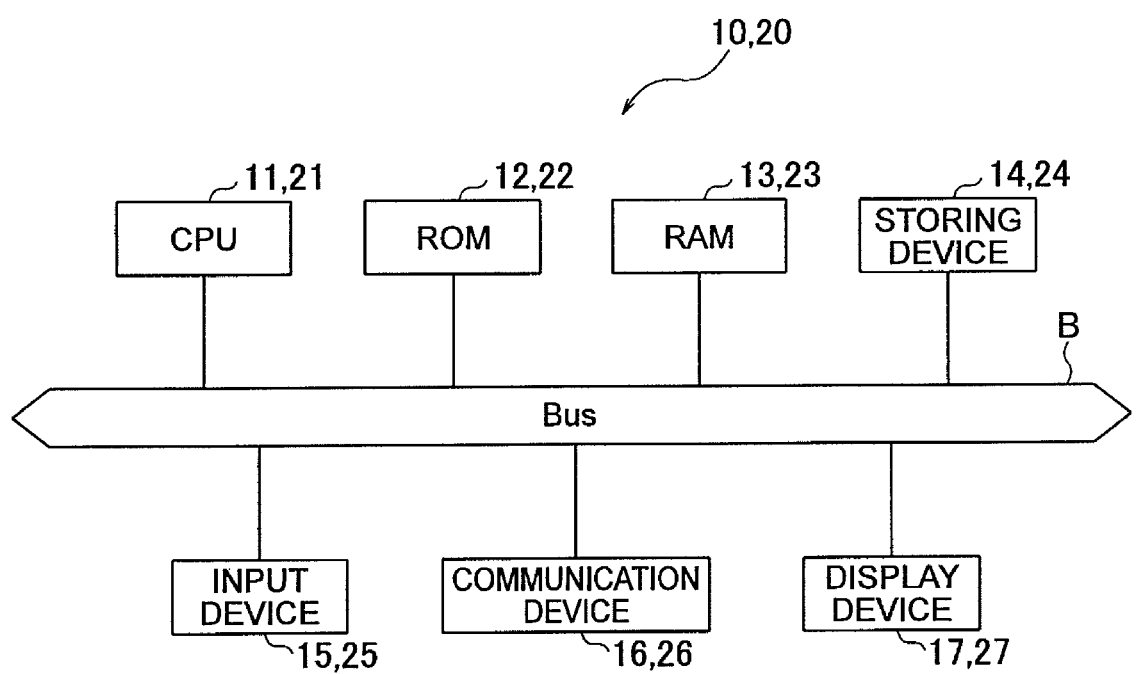
FIG. 3 is a configuration diagram illustrating exemplary basic configuration of the e-mail delivery device and the management device shown in FIG. 2.

The management device 20 may comprise a computer that includes a communication device. Referring to FIG. 3, the management device 20 includes a central processing unit (CPU) 21 that controls the overall operations and functionality of the device based on prescribed programs. Connected to the CPU 21 via a bus B are: a read-only memory (ROM) unit 22 that stores programs for the CPU 21; and a random access memory (RAM) unit 23, which is a readable/writable memory unit including work areas used to store various data necessary for processing by the CPU 21.

Also, a storage device 24 is connected to the CPU 21 via the bus B. The storage device 24 may comprise a hard disk device or a large-capacity memory unit. The storage device 24 stores various programs including a program P2 for management of private information D1, and various information such as a private information database (DB) 40 constructed to associate a membership number of a member with the private information D1 of this member on a one-to-one basis and store the associated information.

The private information D1 is information managed solely by the company involved in the management of the registered members. As shown in FIG. 4, the private information D1 comprises member's personal data used to uniquely identify the members, such as membership number, name, age, sex, address, and e-mail address.

The program P2 for management of the private information D1 stored in the storage device 14 is executed by the CPU 21, so that the CPU 21 functions as various units including a membership number outputting unit P21 and a membership number selecting unit P22. The membership number outputting unit P21 is configured to output the membership numbers of the members to the e-mail delivery device 10. The membership number selecting unit P22 is configured to select a specific membership number from among the membership numbers in accordance with a prescribed delivery condition and outputs a target e-mail to be delivered to the selected membership number to the e-mail delivery device 10.

Although this embodiment describes an example where the private information D1 is stored in the storage device 24 of the management device. 20, the present invention is not limited to this configuration. For example, the e-mail may be delivered to the members in accordance with private information stored in a hard disk device of another PC as long as the private information can be read by the management device 20 via a network.

Still referring to FIG. 3, an input device 25, a communication device 26, and a display device 27 are connected via the bus B to the CPU 21. The input device 25 may comprise a keyboard and a mouse. Various input data that are input using the input device 25 are output to the CPU 21 via the bus B.

The communication device 26 may comprise a communications device suitable for conditions of implementation such as a network adapter and a modem for mobile phones, and function as the communication unit. The communication device 26 is adapted to output received information to the CPU 21, and transmit the information input from the CPU 21 via the Internet 3 to a designated destination.

The display device 27 may comprise a known display unit of various types such as liquid crystal displays and CRT displays. Also, the display device 27 is adapted to display various information based on instructions from the CPU 21.

The e-mail delivery device 10 is described below.

The e-mail delivery device 10, in the same manner as in the above-described management device 20, may comprise a computer having a communication device. As shown in FIG. 3, the e-mail delivery device 10 includes: a central processing unit (CPU) 11; a ROM unit 12; a RAM unit 13; a storage device 14; an input device 15; a communication device 16, which serves as the communication unit in the context of the scope of protection; and a display device 17. Accordingly, explanation of the same or similar elements as in the management device 20 is not repeated here, and the description will be dedicated to elements that differ from the case of the management device 20.

The storage device 14 in the e-mail delivery device 10 is configured to store various information including various programs such as an e-mail delivery program P1 shown in FIG. 2, an identification information database (DB) 50 that contains an identification information element D2, and the log information database (DB) 60 that contains log information element D3 indicative of a result of e-mail delivery. The e-mail delivery program P1 may be downloaded via the Internet and/or installed from a storage medium such as CD-ROM to be stored in the storage device 14. Also, although in this embodiment the identification information element D2 and the log information D3 are stored in separate databases, the present invention is not limited to this configuration. The identification information element D2 and the log information D3 may be stored in a single database.

The identification information element D2 serves as the identification information element in the context of the scope of protection.

Referring to FIG. 5, the identification information element D2 includes: a membership number obtained from the management device 20; an identification data (ID) assigned to the membership number on a per-membership-number basis; an e-mail address assigned to the ID on a per-ID basis; a password that corresponds to the ID; and a forwarding e-mail address designated by a member. In this embodiment, the identification information element D2 comprises the IDs assigned to the members, the e-mail addresses, and the associated passwords. However, the present invention is not limited to this configuration, and it suffices that the identification information element D2 allows unique identification of the membership numbers. Consequently, the identification information element D2 may only include the IDs that each correspond to the membership numbers, or the e-mail addresses that each correspond to the membership numbers.

Also, with regard to the identification data (ID) of the identification information element D2, when the membership number is obtained from the management device 20, the e-mail delivery device 10 assigns, to the ID, for example, a unique number created on the basis of random numbers generated, and/or a number selected from among a predetermined yet-to-be-selected numbers. The e-mail address of the identification information element D2 is defined as one e-mail address assigned from among the yet-to-be-selected e-mail addresses created by the e-mail delivery device 10. The password of the identification information element D2 is defined as a password of, for example, four alphanumeric characters created by the e-mail delivery device 20. In this embodiment, the forwarding e-mail address selected by the member can be specified. If it is not specified by the member, then it is set to NULL.

Also, in this embodiment, the ID is created by character strings and numbers, but the present invention is not limited to this configuration, and only character strings or only the numbers may be used as long as the information can be identified in terms of the membership numbers.

The following describes an exemplary relationship between the identification information element D2 and the e-mail storing unit D12 that corresponds to the identification information element D2 with reference to FIG. 6.

Referring to FIG. 6, the e-mail storing units D12 are each provided corresponding to the elements of the identification information element D2 on a one-to-one basis, and constructed to store an e-mail to be delivered to (a member having) the selected membership number that agrees with the membership number of the corresponding identification information element D2. Specifically, the e-mail storing unit D12 is a storage area where the to-be-selectively-delivered e-mail is stored, which in general may comprise a mailbox. Also, in this embodiment, a predetermined storage area of the storage device 14 is allocated as the e-mail storing units D12. Further, the e-mail storing unit D12 is a storage area of the storage device 14 that is identified by the e-mail address in the identification information element D2. The e-mail to be delivered to the membership number selected by the management device 20 is stored in a time-series manner.

The e-mail delivery device 10 has, by virtue of e-mail application software executed by the CPU 11, the functionality of displaying a list of the e-mails stored in each of the e-mail storing units D12 and transmitting any one of the e-mails requested by the member to this requesting member.

When the members A to N shown in FIG. 2 are registered by the management device 20, the e-mail delivery device 10, as shown in FIG. 6, creates the identification information elements D2a to D2n that correspond to the membership numbers of the members A to N obtained from the management device 20 and stores (registers) the created identification information elements D2a to D2n in the identification information DB 50. For example, for the member A, the membership number of the identification information element D2a is set to 101, ID to A001, e-mail address to B001@xxxx.com, the password to the initial password XXXX, forwarding e-mail address to the "address 001", and thus the identification information element D2a is created by the e-mail delivery device 10. The e-mail delivery device 10 creates the identification information elements D2b to D2n for the members B to N in a similar manner.

Further, the e-mail delivery device 10 defines the e-mail storing units D12a to D12n in the storage device 14 such that the e-mail storing units D12a to D12n each correspond to the created identification information elements D2a to D2n. Also, in this embodiment, an e-mail address of the identification information element D2 indicates a beginning address of the e-mail storing unit D12. The e-mail storing units D12a to D12n may comprise an external storage device external to the e-mail delivery device 10 or a storage device of a personal computer on the network to which the e-mail delivery device 10 can be connected.

As shown in FIG. 6, the log information D3 includes various data such as the IDs corresponding to the target members to whom the to-be-distributed information is to be distributed, and delivery results corresponding to the IDs. It should be noted however, that the delivery results may defined as appropriate in accordance with system specification such as delivery results indicating whether or not the e-mail has been stored in (or delivered to) the e-mail storing units D12 of the to-be-distributed information, or the delivery results indicating whether or not the member has referenced the to-be-distributed information stored in the e-mail storing unit D12, or delivery results indicating both of these results in multiple stages.

The e-mail delivery program P1 shown in FIG. 2 is configured for communications via the communication unit 16 with the management device 20 that manages the registered members' individual private information and the membership number indicating the number with these two elements associated with each other. It is an e-mail delivery program that makes the CPU (computer) 11 of the e-mail delivery device 10 (which delivers the e-mail to the intended target member(s) from among the registered members) function as (a) a membership number acquisition unit P11, (b) an identification information creation unit P12, (c) a notification unit P13, (d) a target e-mail acquisition unit P14, (e) a delivery unit P15, and (f) a transmitting unit P16.

The membership number acquisition unit P11 is configured for obtaining the membership numbers of the members from the management device 20 via the communication unit 16.

The identification information creation unit P12 is configured for (i) assigning a unique identification data to each of the membership numbers that have been obtained by the membership number acquisition unit P11, (ii) creating identification information containing the obtained membership number and the identification data assigned thereto, (iii) storing the created identification information in an identification information storing unit, and (iv) assigning the e-mail storing unit, which is configured for storing the e-mail that corresponds to the identification information, to the identification information on a one-to-one basis.

The notification unit P13 is configured for reporting the created identification information to the management device 20 via the communication unit 16.

The target e-mail acquisition unit P14 is configured for obtaining (a) a selected membership number and (b) a target e-mail from the management device 20 via the communication unit 16, the selected membership number being selected in accordance with a prescribed delivery condition from among the membership numbers, the selection being performed by the management device 20, and the target e-mail to be delivered to the selected membership number.

The delivery unit P15 is configured for (i) identifying the identification information containing the membership number that agrees with the obtained selected membership number and (ii) storing the obtained e-mail in the e-mail storing unit D12 that corresponds to the identified identification information.

The transmitting unit P16 is configured for (i) identifying the e-mail storing unit D12 that corresponds to the identification information that has been designated by the member and (ii) transmitting the e-mail that is stored in the e-mail storing unit D12 to this member.

The CPU 11 executes the e-mail delivery program P1 to function as the above various units.

The following describes an exemplary operation performed as the CPU 21 executes the program P2 of the management device 20, and e-mail delivery operation performed as the CPU 11 executes the e-mail delivery program P1 of the e-mail delivery device 10 with reference to the flowcharts of FIGS. 8 to 11.

It should be noted here that this embodiment is described in the context of the previously-described e-mail delivery system 1 in which an e-mail is intended to be delivered to a member having the selected membership number selected by the management device 20 from among members A to N registered in the music distribution company, the selection being made on the basis of the private information D1 of the registered members A to N.

(Operation Associated with Membership Registration)

Figure 8:
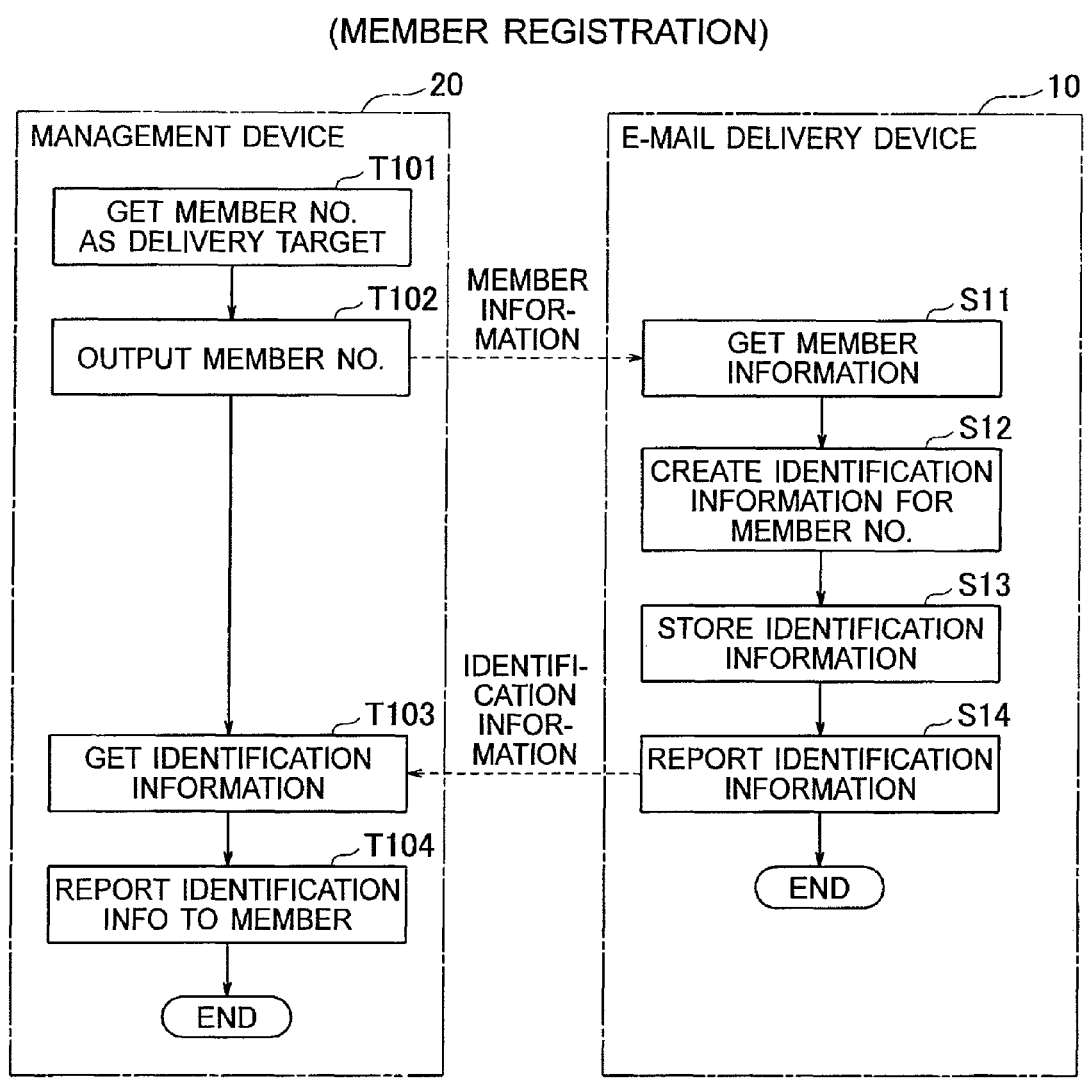
FIG. 8 is a flowchart illustrating outline of operation of membership registration performed by central processing units of thee-mail delivery device and the management device shown in FIG. 3.

The following describes, with reference to FIG. 8, outline of exemplary operations performed by the CPU 21 of the management device 20 and the CPU 11 of the e-mail delivery device 10 in the event that a new member is registered in the management device 20.

In the step T101, the management device 20 obtains the membership number that is to be newly registered as a delivery destination from the private information DB 40. In the step T102 (which corresponds to the membership number outputting unit), the management device 20 outputs the obtained membership number to the e-mail delivery device 10 via the communication device 26. As an exemplary mode of acquisition of the membership number, a method may be used that employs a predetermined electronic registry for assignment of the membership numbers.

Meanwhile, in the step S11 (which corresponds to the identification information acquisition unit P11), the e-mail delivery device 10 obtains (receives) the membership number that has been output by the management device 20 via the communication device 16, and then the process goes to the step S12. It should be noted that as methodology of acquisition of the membership numbers, the management device 20 may store the membership numbers in a removable storage medium and the e-mail delivery device 10 may read the membership numbers from the storage medium. Other variant embodiments can be conceived.

In the step S12 (which corresponds to the identification information creation unit P12), the e-mail delivery device 10 creates the identification information that corresponds to the obtained membership number, and then the process goes to the step S13. Specifically, the e-mail delivery device 10 (i) assigns a unique ID (identification data), an e-mail address, and a password associated therewith to each of the obtained membership numbers, (ii) creates the identification information element D2 that contains the obtained membership number, the ID, the e-mail address, and the password associated therewith (see FIG. 5), and (iii) assigns the e-mail storing units D12 on a one-to-one basis as shown in FIG. 6 to the individual identification information elements, the e-mail storing units D12 being adapted to store the e-mail that corresponds to the e-mail address of the identification information element D2.

In the step S13, the e-mail delivery device 10 associates the identification information element D2 created in the step S12 with the membership number, and stores them in the identification information DB 50. Further, in the step S14 (which corresponds to the notification unit P13), the e-mail delivery device 10 outputs (transmits) the identification information to the management device 20 via the communication device 16, and report to the management device 20, and then terminates the process.

Meanwhile, in the step T103, the management device 20 obtains (receives) the membership number that has been output by the management device 20 via the communication device 26. In the step T104 that follows, the management device 20 (i) associates the obtained identification information with the private information D1 by referencing the membership number contained in the identification information, (ii) stores the associated identification information in the storage device 24, (iii) creates an e-mail containing the identification information, and (iv) transmits the created e-mail to the member, and then terminates the process.

By virtue of these steps, the member is allowed to confirm the ID, the e-mail address, and the password that are assigned by the e-mail delivery device 10, the member's confirmation being made by referencing the identification information reported by the management device 20.

In addition, when the management device 20 obtains the assigned ID the associated password, and for a forwarding e-mail address from the member, the management device 20 outputs them to the e-mail delivery device 10 via the communication device 14. The e-mail delivery device 10 in turn functions as a forwarding e-mail address acquisition unit P17: The e-mail delivery device 10 obtains the ID, the password, and the forwarding e-mail address via the communication device 14 from the management device 20, performs authentication on the basis of the ID and the password. When the authentication is successful, then the e-mail delivery device 10 extracts the identification information element D2 corresponding to the ID out of the identification information DB 50 and specifies the forwarding e-mail address.

(Operation in the Event of Delivery Request Generated)

Figure 9:
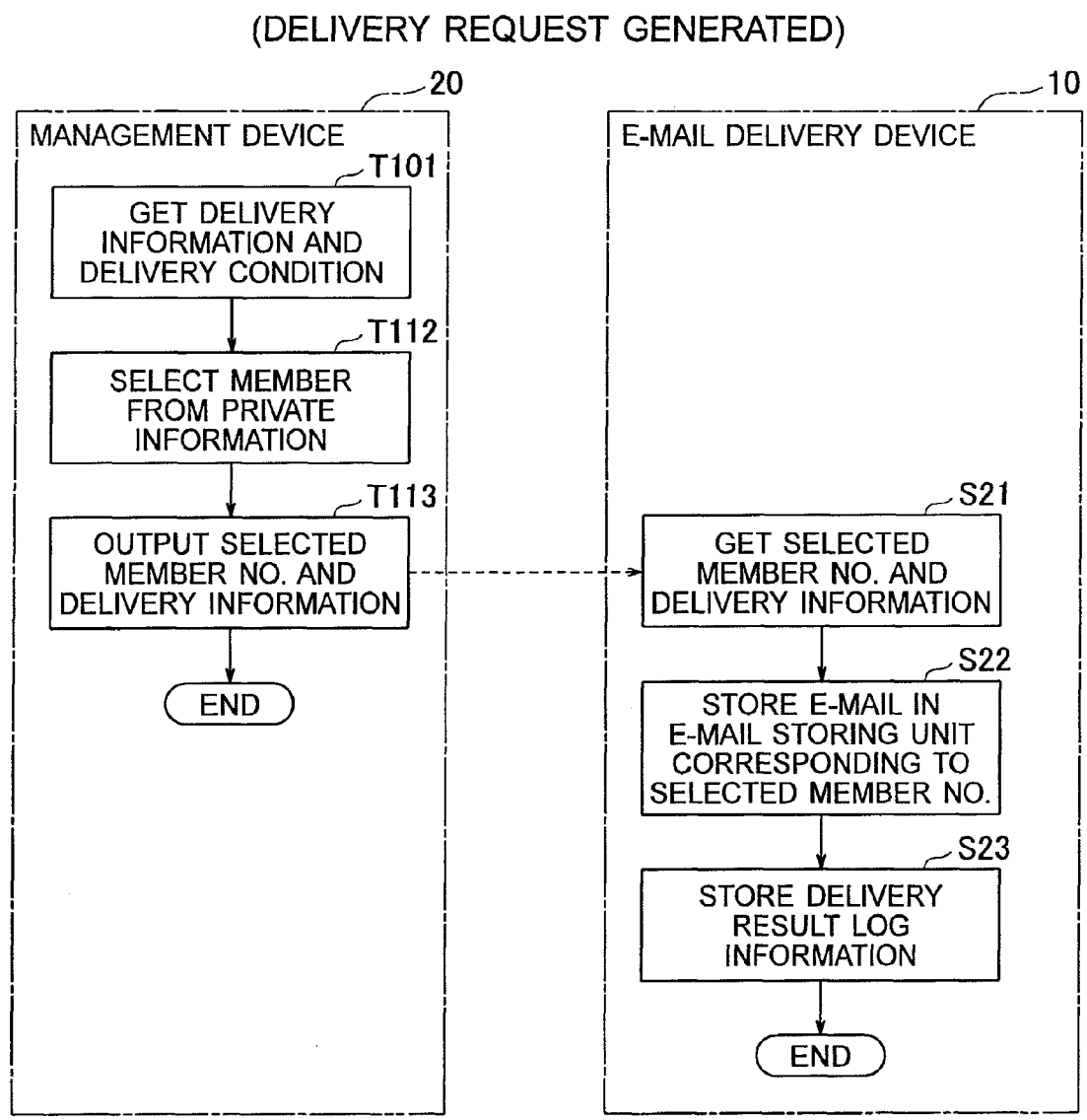
FIG. 9 is a flowchart of outline of operation in the event of creation of a delivery request by the CPUs of the e-mail delivery device and the management device shown in FIG. 3.

The following describes, with reference to FIG. 9, an exemplary outline of operation performed by the CPU 21 of the management device 20 and operation performed by the CPU 11 of the e-mail delivery device 10 in the event that a delivery request for to-be-distributed information is created in the management device 20.

In the step T111, the management device 20 obtains a prescribed delivery condition and to-be-distributed information specified by the administrator or the information provider. In the step T112, the management device 20 compares the delivery condition with the private information element D1 in the private information DB 40, and selects the private information database 40 that meets the delivery condition, and selects the membership number corresponding to the selected private information D1 as the selected membership number. In the step T113, the management device 20 outputs the selected membership number and the to-be-distributed information (which may be e-mail) selected in the step T112 to the e-mail delivery device 10 via the communication device 26 and then terminates the process.

This embodiment describes a case where the management device 20 outputs the to-be-distributed information to the e-mail delivery device 10. Since the to-be-distributed information is content of the e-mail in the context of the present invention, the to-be-distributed information may be output as an e-mail. Also, the delivery condition is information for use in selecting an intended member for which the e-mail is to be delivered from among the members. For example, women between the ages of 20 and 40, men and women in their twenties may be the delivery condition. Further, methodology of inputting of the delivery condition may be provided using various techniques such as inputting via a dedicated display screen.

Meanwhile, in the step S21 (which corresponds to the target e-mail acquisition unit P14), the e-mail delivery device 10 obtains (receives) the selected membership number and the to-be-distributed information (e-mail) that are output by the management device 20 via the communication device 16. In the step S22 (which corresponds to the delivery unit P15), the e-mail delivery device 10 compares the obtained selected membership number with the membership number of the identification information element D2 of the identification information DB 50, identifies the identification information element D2 having the membership number that agrees with the obtained selected membership number, and adds the obtained to-be-distributed information to the e-mail storing unit D12 that corresponds to the specified identification information element D2. Further, in the step S23, the e-mail delivery device 10 creates the log information D3 that contains (a) the ID of the specified identification information element D2 and (b) a delivery result, associates the log information D3 with the to-be-distributed information, stores the associated log information D3 in the log information DB 60, and then terminates the process.

Through these steps, the e-mail as the to-be-distributed information is only stored in the e-mail storing unit D12 that corresponds to a member out of the members A to N who meets the delivery condition to be delivered to this member. Also, the email is not delivered to the e-mail storing units D12 that correspond to those members who do not meet the delivery condition.

(Operation Associated with E-Mail Transmission)

Figure 10:
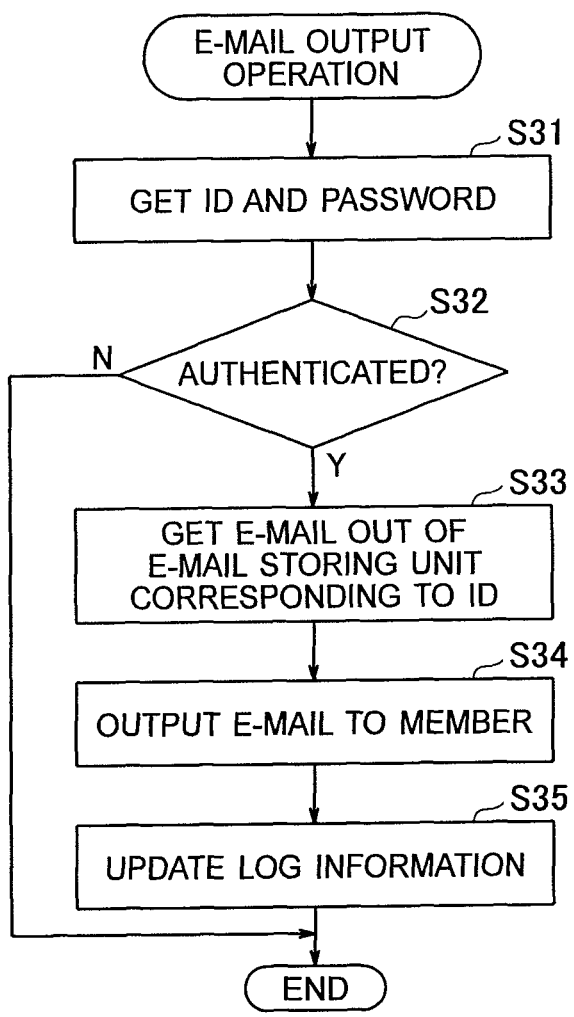
FIG. 10 is a flowchart of an exemplary e-mail output operation performed by a central processing unit of e-mail delivery operation shown in FIG. 3.

The following describes, with reference to a flowchart of FIG. 10, an exemplary e-mail output operation performed by the CPU 11 of the e-mail delivery device 10 when an e-mail output request is created by a member.

The e-mail delivery device 10 performs e-mail output operation in response to reception of the output request from the member's terminal device via the communication device 14. In the step S31, e-mail delivery device 10 obtains the member's ID and the password from the member's terminal device via the communication device 16. In the step S32, e-mail delivery device 10 compares the obtained ID and the password with the ID and the password of the identification information element D2 stored in the identification information DB 50 and performs authentication of the member.

In the step S32, the e-mail delivery device 10 judges whether or not authentication has been successfully made, with reference to the result of authentication. When it is judged that the authentication is not successful (No in the step S32), the e-mail delivery device 10 terminates the process. Meanwhile, when the e-mail delivery device 10 judges that the authentication has been successful (Yes in the step S32), then the e-mail delivery device 10 in the step S33 obtains the e-mail if this e-mail is stored in the e-mail storing unit D12 that corresponds to the ID, and the process goes to the step S34. It should be noted that the description of the operation in the event of the e-mail not being stored in the e-mail storing unit D12 is omitted. For example, an operation may be performed for reporting the event to the member.

In the step S34 (which corresponds to the e-mail transmitting unit P16, forwarding unit P18), the e-mail delivery device 10 transmits the obtained e-mail to the member's terminal device via the communication device 16. When the forwarding e-mail address is specified in the identification information element D2, the obtained e-mail is forwarded to the forwarding e-mail address via the communication device 16. In the step S35, the e-mail delivery device 10 updates the log information D3 and sees to it that the result of transmission is reflected to the log information D3 that corresponds to the to-be-distributed information of the e-mail that has been transmitted or forwarded, and then terminates the process.

(Log Information Transfer Operation)

Figure 11:
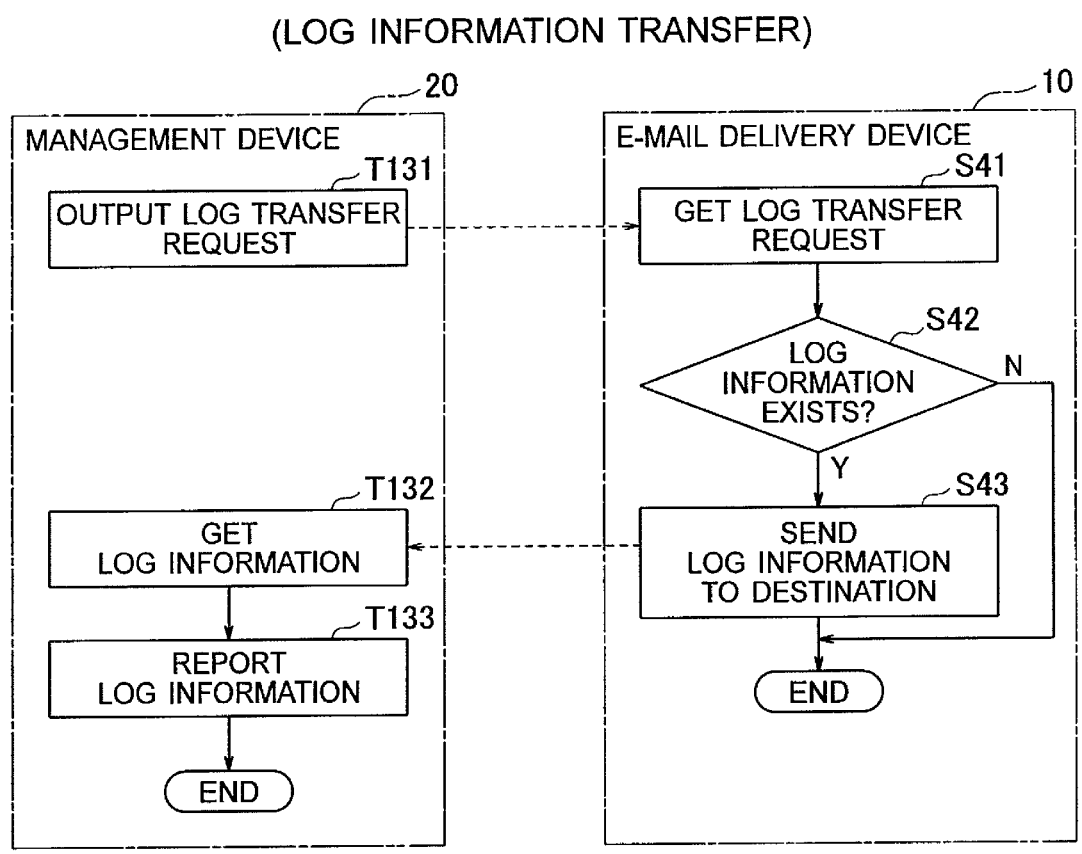
FIG. 11 is a flowchart of outline of operation of membership registration performed by the CPUs of the e-mail delivery device and the management device shown in FIG. 3.

The following describes, with reference to FIG. 11, outline of exemplary operation performed by the CPU 21 of the management device 20 and the CPU 11 of the e-mail delivery device 10 in the event that the management device 20 requests the e-mail delivery device 10 to transfer the log information D3.

In the step T131, when a log forwarding request for log information corresponding to the prescribed to-be-distributed information is created by the administrator or the information provider, the management device 20 outputs the log forwarding request to the e-mail delivery device 10 via the communication device 24.

Meanwhile, in the step S41, the e-mail delivery device 10 obtains the log forwarding request from the management device 20 via the communication device 16. In the step S42, the e-mail delivery device 10 judges whether or not log information that corresponds to the log forwarding request resides in the log information DB 60. When the e-mail delivery device 10 judges that the log information D3 does not exist (No in S42), the e-mail delivery device 10 reports the result to the management device 20, and terminates the process. Meanwhile, when the e-mail delivery device 10 judges that the log information D3 exists (Yes in S42), then the e-mail delivery device 10 in the step S43 (which corresponds to the log information transmitting unit P19) extracts the log information D3 from the log information DB 60, transmits the log information D3 via the communication device 16 to the management device 20 which is the destination (of log information transmission) in this embodiment, and terminates the process. It should be noted that any destination may be specified.

Meanwhile, in the step T132, the management device 20 has obtained the log information D3 from the e-mail delivery device 10 via the communication device 26. In the step T133, the management device 20 outputs the obtained log information D3 on the display device 27 for reporting it to the administrator or the information provider, and terminates the process.

In the above-described e-mail delivery system 1 and the e-mail delivery device 10, when an e-mail is delivered to an intended member from among the registered members A to N, the membership numbers of the members are obtained from the management device 20 and the identification information elements D2 are created that each corresponds to each of the membership numbers. The e-mail storing units D12 are provided that correspond to each of the identification information elements D2, and the e-mail is stored in the e-mail reception storing unit D12 that corresponds to the selected membership number selected from the management device 20 so that the e-mail is delivered to the intended member. Accordingly, it allows reliably delivery of the e-mail to the intended member without the need for the party delivering the e-mail to hold the member's private information D1, which in turn allows the e-mail delivery operation to be outsourced to another company. Further, since the party delivering the e-mail does not need to hold the private information D1, it is possible to prevent inadvertent leakage of the member's private information D1 and unauthorized use of the private information D1, which contributes to improved security.

Also, when e-mail delivery operation is outsourced to other companies, the member's private information D1 does not need to be disclosed to those third party, and thus leakage of the private information D1 can be effectively prevented. Also, management can be made possible only using the membership number and the system's maintenance costs can be minimized.

Also, since the e-mail storing units D12 that correspond to the members on a one-to-one basis is provided, it is possible to deliver the to-be-delivered e-mail to the e-mail storing unit D12 of the delivery destination, and deliver information by the e-mail even to members whose e-mail addresses are not registered as the private information D1. Further, since the e-mail stored in the e-mail storing units D12 that correspond to the identification information element D2 on a one-to-one basis is transmitted to the member, the e-mail is not directly delivered to the member's individual e-mail address, making it possible for the member to obtain the necessary to-be-distributed information without registration of the member's private information.

Further, since the e-mail stored in the e-mail storing units D12 is forwarded to the forwarding e-mail address that has been registered by the member, it is possible to forward the e-mail to the e-mail address used by the member without holding the member's private information D1 other than the e-mail address, which makes it possible for the member to view the e-mail that has been delivered with higher probability.

Also, since the log information D3 indicative of the result of delivery of the e-mail to the selected membership number is stored, it is possible, for example, to confirm whether or not the e-mail has been successfully delivered to the intended member selected by the delivery condition by referencing the log information D3 by the information provider and the management device.

Further, since the log information D3 stored in the log information DB 60 (log information storing unit) is transmitted to the predetermined destination, the information provider and the management device 20 are allowed to confirm to which members the information provider (information sender) is delivered on the basis of the log information D3 through setting the destination as the information provider or the management device 20, and manage the delivery history using the log information D3.

It should be noted that the embodiments have only been illustrated as a typical illustrations of the present invention, and the present invention is in no way limited to the illustrated embodiments. Hence, the present invention can be effectuated with various modifications made thereto within the scope of the present invention.

The invention claimed is:

1. An e-mail delivery device configured for communication with a management device, the management device being configured to associate membership numbers each indicative of registered members with private information of the registered members for management of the membership numbers and the private information, and configured for delivering an e-mail to an intended target member from among the registered members, the e-mail delivery device comprising:
   (a) a membership number acquisition unit configured to obtain any one of the membership numbers of the members from the management device via a communication unit;
   (b) an identification information creation unit configured to (i) assign a unique identification data to each of the membership numbers that have been obtained by the membership number acquisition unit, (ii) create identification information element containing the obtained membership number and the identification data assigned thereto, and (iii) assigning an e-mail storing unit to the identification information element on a one-to-one basis, the e-mail storing unit being adapted to store an e-mail that corresponds to the identification information element;
   (c) a notification unit configured to report the created identification information element to the management device via the communication unit;
   (d) an identification information storing unit configured to associate the created identification information element with the membership number and store the associated identification information element;
   (e) a target e-mail acquisition unit configured to obtain (i) a selected membership number and (ii) a target e-mail from the management device via the communication unit, the selected membership number being selected from among the membership numbers in accordance with a prescribed delivery condition, the selection being performed by the management device, and the target e-mail being intended to be delivered to the selected membership number;
   (f) delivery unit configured to (i) identify the identification information element containing the membership number that agrees with the obtained selected membership number and (ii) store the obtained e-mail in the e-mail storing unit that corresponds to the identified identification information element; and
   (g) a transmitting unit configured to (i) identify the e-mail storing unit that corresponds to the identification information element that has been designated by the member and (ii) transmit the e-mail stored in the e-mail storing unit to this member.

2. The e-mail delivery device as set forth in claim 1, further comprising:
   a forwarding e-mail address acquisition unit configured to obtain via the communication unit a forwarding e-mail address to which the e-mail in the e-mail storing unit is to be delivered, and associate the forwarding e-mail address with the e-mail storing unit; and
   a forwarding unit configured to forward the e-mail stored in the e-mail storing unit to the obtained forwarding e-mail address.

3. The e-mail delivery device according to claim 1 or 2, further comprising a log information storing unit configured to indicate log information indicative of a delivery result of the e-mail to the selected membership number, the e-mail being obtained by the target e-mail acquisition unit.

4. The e-mail delivery device according to claim 3, wherein the log information storing unit includes a log information transmitting unit configured to transmit the log information to a predetermined destination.

5. An e-mail delivery system that comprises the e-mail delivery device and the management device recited in any one of claims 1 to 2, the management device including:
   a membership number outputting unit configured to output the membership number of the member to the e-mail delivery device; and
   a membership number selecting unit configured to select a selected membership number from among the members in accordance with the prescribed delivery condition and output the selected membership number and the e-mail to be delivered to the selected membership number to the e-mail delivery device.

6. A computer-executable e-mail delivery program residing on a non-transitory computer-readable medium of a computer of an e-mail delivery device that is configured for communication with a management device, the management device being configured to associate membership numbers each indicative of registered members with private information of the registered members for management of the membership numbers and the private information, and deliver e-mail to an intended target member from among the registered members, the program being configured for providing the computer with functions including:
   (a) membership number acquisition unit configured to obtain the member's membership number from the management device via the communication unit;
   (b) an identification information creation unit configured to (i) assign a unique identification data to each of the membership numbers that have been obtained by the membership number acquisition unit, (ii) create identification information element containing the obtained membership number and the identification data assigned thereto, (iii) store the created identification information element in an identification information storing unit, and (iv) assign the e-mail storing unit to the identification information element on a one-to-one basis, the e-mail storing unit being adapted to store the e-mail that corresponds to the identification information element;
   (c) a notification unit configured to report the created identification information element to the management device via the communication unit;
   (d) an identification information storing unit configured to associate the created identification information element with the membership number and store the associated identification information element;

(e) a target e-mail acquisition unit configured to obtain (i) a selected membership number and (ii) a target e-mail from the management device via the communication unit, the selected membership number being selected from among the membership numbers in accordance with a prescribed delivery condition, the selection being performed by the management device, and the target e-mail being intended to be delivered to the selected membership number;

(f) a delivery unit configured to (i) identify the identification information element containing the membership number that agrees with the obtained selected membership number and (ii) store the obtained e-mail in the e-mail storing unit that corresponds to the identified identification information element; and (g) a transmitting unit configured to (i) identify the e-mail storing unit that corresponds to the identification information element that has been designated by the member and (ii) transmit the e-mail stored in the e-mail storing unit to this member, wherein said units of the program reside on a non-transitory computer-readable medium of a computer.

\* \* \* \* \*